United States Patent [19]
McKee

[11] Patent Number: 5,390,609
[45] Date of Patent: Feb. 21, 1995

[54] DESK STRUCTURE

[76] Inventor: Carl B. McKee, 29971 Homeland Ave., New Hudson, Mich. 48165

[21] Appl. No.: 36,695

[22] Filed: Mar. 25, 1993

Related U.S. Application Data

[63] Continuation of Ser. No. 873,772, Apr. 27, 1992, abandoned.

[51] Int. Cl.⁶ .............................................. A47B 23/00
[52] U.S. Cl. ...................................................... 108/45
[58] Field of Search ..................... 108/43, 44, 45, 47, 108/42; 248/444.1; 224/42.11, 42.42

[56] References Cited

U.S. PATENT DOCUMENTS

| | | | |
|---|---|---|---|
| 3,086,658 | 4/1963 | Palmer | 248/444.1 X |
| 3,109,537 | 11/1963 | Larkin | 108/44 X |
| 3,509,577 | 6/1971 | Basinger | 108/44 X |
| 4,359,004 | 11/1982 | Chappell | 108/44 |
| 4,371,138 | 2/1983 | Roberts | 108/44 X |
| 4,795,210 | 1/1989 | Milat | 108/43 X |
| 4,946,120 | 8/1990 | Hatcher | 108/44 X |
| 4,976,204 | 12/1990 | Konkle | 108/43 |
| 5,085,153 | 2/1992 | McKee | 108/44 |

Primary Examiner—Jose V. Chen
Attorney, Agent, or Firm—Howard & Howard

[57] ABSTRACT

A desk structure is provided for adjustable positioning upon vehicular consoles of variable contours and dimensions in tight gripping relation therewith, and yet readily removable to transfer to a different environment providing generally similar support therefor. A pair of precisely contoured leg members support a cavitated table top member, the leg members being formed of a substantially rigid transparent thermoplastic material and each having a rearwardly facing curvilinear surface providing ease of access by the vehicle operator or driver to control mechanisms on the console. Structure is provided on the leg members for lateral adjustment thereof to accommodate consoles of varying dimensions.

14 Claims, 2 Drawing Sheets

5,390,609

DESK STRUCTURE

This application is a continuation of pending application Ser. No. 07/873,772, filed Apr. 27, 1992, now abandoned.

BACKGROUND OF THE INVENTION

The introductory paragraphs in my U.S. Pat. No. 5,085,153 make reference to prior art desk structures, and set forth the inherent deficiencies therein. The descriptive portion in my noted patent then details the novel structural arrangement by means of which the disadvantageous characteristics of the prior art have been avoided. More specifically, the patented desk structure is constructed to be removably seated in the console area of a vehicle, preferably upon the movable or tiltable arm rest between the driver and passenger seats. The described desk structure comprises a generally box-like base framework fixedly mounting thereon a substantially flat top member provided with a plurality of cavities for receiving such objects as a writing tablet, cushion means, and mobile telephone or other communication apparatus.

While the desk structure of U.S. Pat. No. 5,085,153 has fulfilled a need long existing in the art, the trend, particularly in automotive vehicles, is to supplant the arm rest with console structure. This replacement is in part attributable to elimination of the tunnel hump, occasioned by consumer preference for a front wheel drive vehicle. Additionally, in air and sea vehicles, as well as in trucks and farm tractors, a console structure has long been present in close proximity to the operator thereof.

SUMMARY OF THE INVENTION

Applicant has now provided a new and improved desk structure for adjustable positioning upon vehicular consoles of variable contours and dimensions in tight gripping relation therewith, and readily transferrable to a different environment, exemplified by a chair or sofa. The desk structure of this invention incorporates a pair of legs which partially straddle the console, each of the legs being precisely shaped to provide ease of access to controls on the console and further featuring substantial transparency to provide visual clarity with respect to the console-situated control mechanisms.

The uniquely configured legs fixedly support thereon a substantially flat thermoformed top member having a plurality of cavities formed therein for receiving a variety of accessories within ready reach of the operator or driver, without interference with safe operation of the vehicle. Illustrative of the accessories which may be removably positioned within the cavities are a pen and writing tablet and mobile telephone, and as well, such office items as a calculator, organizer bin, card index holder, file folder, or telecopier machine.

It is significant to note that throughout the design and fabrication of the desk structure of the present invention careful attention was given to human engineering or ergonomics. The characteristics of people, exemplified by the average operator or driver, were considered in designing the total desk structure and arrangement of accessories to be positioned thereon in order that people and applicant's invention interact most effectively and safely. Consideration of the concept of ergonomics does not appear to be manifested in the prior art desk structures of which applicant is aware.

DESCRIPTION OF A PREFERRED EMBODIMENT

Figure 1:
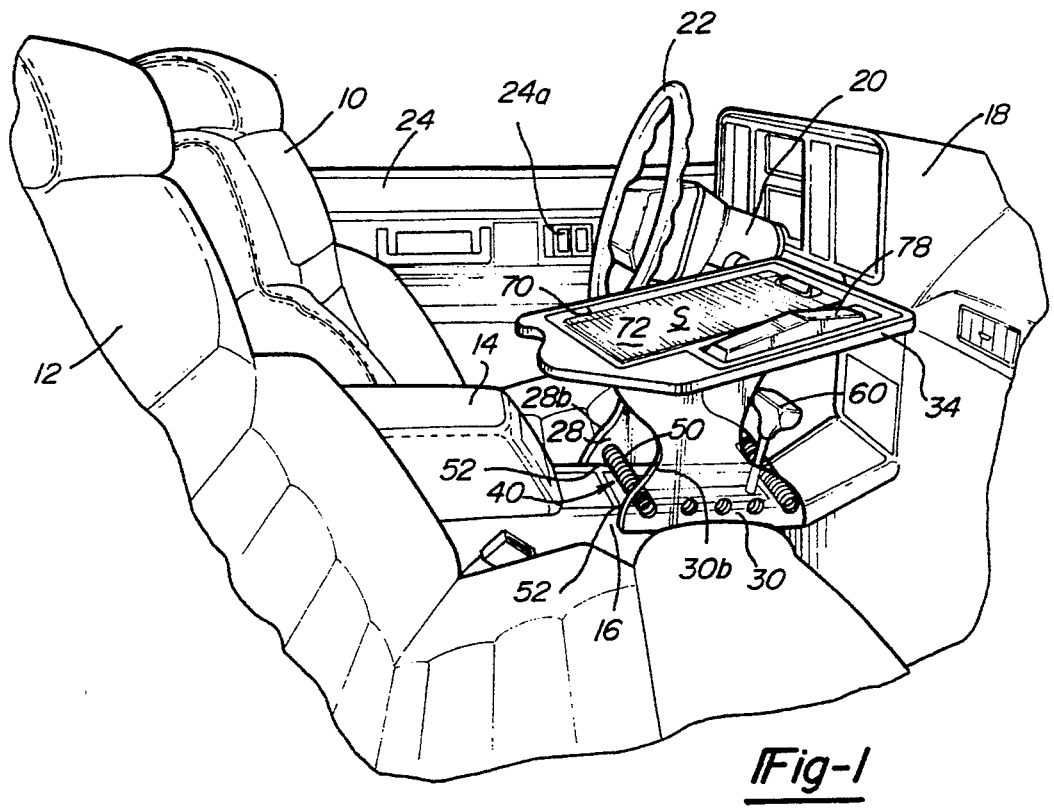
FIG. 1 is a perspective view of a typical automobile front interior and showing the present invention positioned therein.

Referring now first to FIG. 1 of the drawings, there is shown an exemplary environment for the present invention. Illustrated therein is the front section of an automobile interior, typically comprised of driver's seat 10 and passenger's seat 12 of the bucket type separated by arm rest 14 supported upon console 16 connected to dash board structure 18. Arm rest 14 may typically be of the swingable or tiltable type, and may or may not be hingedly connected to console 16. As is also typical of an automobile front section interior, steering column 20 supporting thereon wheel 22 extends from dash board structure 18, and driver's door 24 may mount control means 24a operating mechanisms for door locking and window opening functions.

Figure 3:
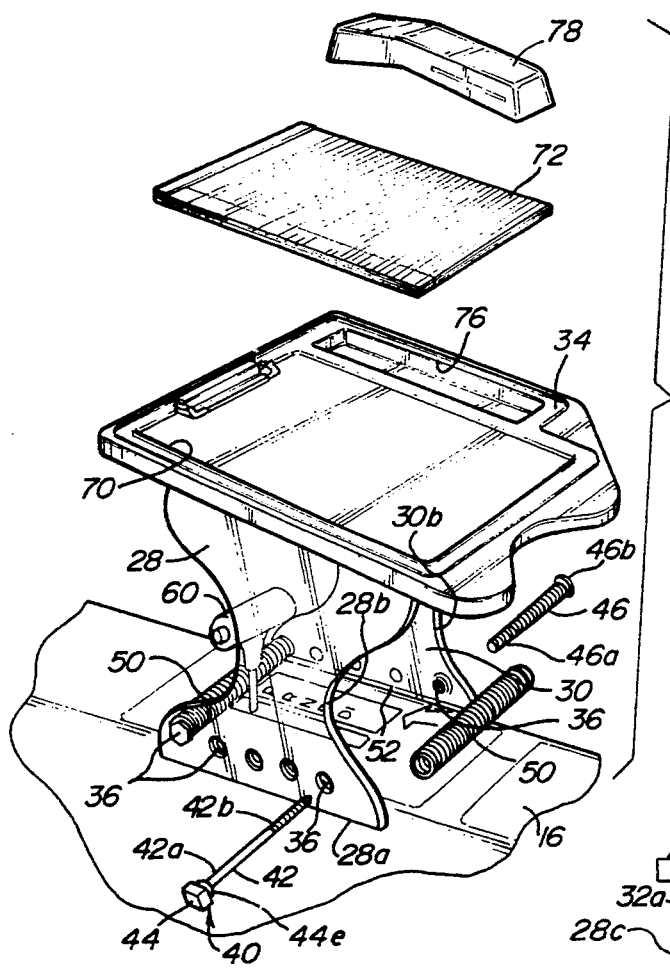
FIG. 3 is an exploded perspective view of the present desk structure in order to more fully illustrate certain parts thereof.
Figure 4:
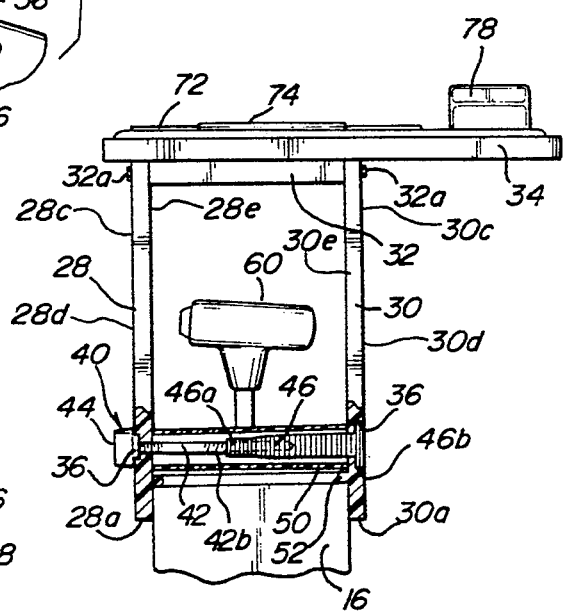
FIG. 4 is an end elevation view of applicant's invention, a portion thereof being broken away and shown in section to show in more detail presently preferred form of adjustment means.
Figure 5:
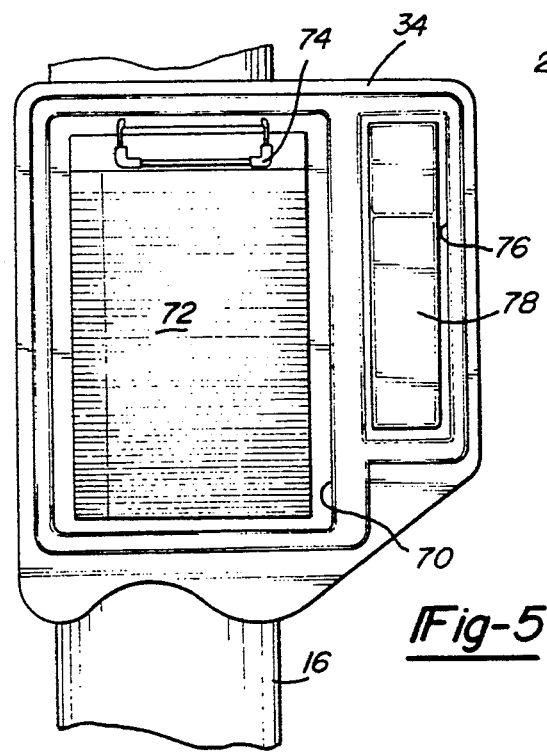
FIG. 5 is a top plan view of the present desk structure.

Applicant's desk structure is designated generally herein by the legend S, and as may also be seen in FIGS. 3 and 4, comprises a pair of contoured spaced leg members 28 and 30. Each of the leg members along the upper portion, 28c and 30c thereof is fixedly secured by fastening means 32a to one wall of a substantially rigid block or pad member 32. Mounted upon the block member 32 and affixed thereto in any suitable manner is table top member 34 having transverse and longitudinal dimensions substantially greater than the block member 32, thereby extending beyond or overlying the outer surfaces 28d and 30d of the leg members 28 and 30.

Each of the leg members 28 and 30 is provided with a plurality of longitudinally spaced counterbored holes or openings 36, located upwardly or inwardly of lower portion 28a and 30a of each leg member 28 and 30, respectively. Received in two spaced holes 36 in each of the leg members or vertical supports 28 and 30 is adjustment means 40, shown in more detail in FIGS. 3 and 4. The adjustment means function in an effective manner to cause the desk structure S, and more particularly the lower portions of the leg members 28 and 30, to firmly grippingly engage the side walls of console 16 with inner surfaces 28e and 30e by lateral movement of the leg member lower end portions. In this manner, there is assurance that the desk structure S will not become dislodged from the console, or move relative thereto during use. Additionally, bearing in mind that consoles vary in dimensions depending upon the make and model of the vehicle, the adjustment means 40 herein provided permits one size desk structure S to be readily adaptable to a wide variety of consoles.

Referring now again to FIGS. 3 and 4, adjustment means 40 preferably comprises a relatively slender rod member 42 externally threaded at one end, as at 42b, and mounting at an opposite end 42a knob means 44. Rod member 42 partially receives thereon in engagement with threaded portion 42b of the rod member relatively non-resilient spring means 46, constructed to provide at one end a reduced diameter portion 46a and at its opposite end a larger diameter portion 46b which seats in counterbored hole 36 in the leg members 28 and 30. If desired, knob means 44 may be shaped to include reduced diameter portion 44e which similarly seats in counterbored hole 36 in the other or opposite leg member 28 or 30. Also if desired, rod member 42 may receive thereon cover means 50, which may be constructed of a flexible accordion-like elastomeric material. A plurality of counterbored holes 36 are provided in order that, when the adjustment means 40 are positioned therein, no interference is encountered with control means on console 16.

The operation of the adjustment means 40 is believed now apparent from the preceding description. The application of a clockwise turning force upon knob means 44 will cause leg members 28 and 30, and more particularly the lower end portions thereof to move inwardly into firm gripping engagement with the side walls of console 16, and conversely, a counter-clockwise force will release the leg members. In this manner, adaptability of the desk structure S of this invention to varying sizes of consoles is assured. Should there be encountered console structures which are not substantially rectangular in the sense that a more complex shape is presented, it may be found expedient to form the lower ends of each of the leg members with a downwardly extending protrusion and provide cushioning means on the outer surfaces thereof. Of course, other modifications may be effected in order to effect firm securement of the desk structure to rounded or otherwise configured consoles.

During location of desk structure S upon console 16, it may be found desirable to control the positioning thereon. Accordingly, there may be provided upon the inner surfaces of the leg members 28 and 30 upwardly of the bottom edges of lower portions 28a and 30a thereof stop or limit means 52. This may take the form of an elongated horizontal bead integral with the leg members 28 and 30, or other means considered the equivalent thereof.

Figure 2:
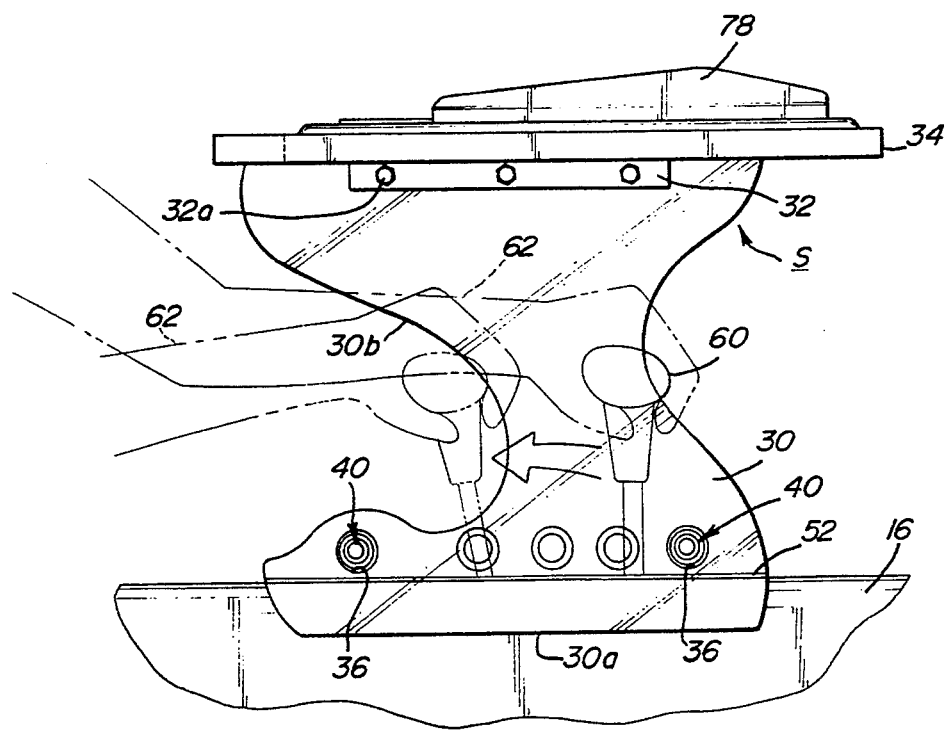
FIG. 2 is a side elevation view of applicant's desk structure phantom lines being employed therein to show ease of access to control means on the console.

With particular reference now to FIGS. 2 and 3 of the drawings, it is significant to note that rearwardly facing or back edge surface 28b and 30b of each of the leg members 28 and 30 is curvilinear. This precise contour in the location indicated provides the driver or operator of the vehicle ease of access to gear shift lever 60. This may be more clearly seen in FIG. 2, wherein the numeral 62 has been applied to a graphic representation of a human hand. The gear shift lever 60 may or may not be canted as shown. As an alternative, the gear shift lever in certain vehicles may be located on the steering column 20 or otherwise positioned within the vehicle. In this event, the console 16 may support control mechanisms for locking or unlocking the doors, opening and closing the door windows, and the like, previously indicated at 24a as positioned on door 24. Curvilinear surfaces 28b and 30b on leg members 28 and 30 again provide the driver or operator with ready access to the console 16.

Functioning in combination with the precisely contoured leg members 28 and 30 to provide ease of access to any control mechanism on console 16 is the transparency of these members. A presently preferred material for this purpose is polycarbonate resin, although other synthetic thermoplastics having the requisite physical and chemical properties are within the purview of this invention.

Table top member 34 may also be formed of a thermoplastic polymer, and a presently preferred material is ABS resin (acrylonitrile-butadiene-styrene copolymer). As is known, ABS resin may be processed by conventional molding and extrusion methods, and in production of table top member 34 thermoforming is presently preferred. Other thermoplastic resins and fabrication techniques are of course within the scope of the present invention.

Table top member 34 is formed with a plurality of cavities therein, and reference was made hereinabove to the wide variety of useful accessories which may be positioned therein. In effect, the desk structure S of this invention, when designed to accommodate particular accessories, functions effectively as a mobile office. Additionally, the desk structure S may be readily removed from its console location, and positioned in gripping engagement with an arm of a chair or sofa in the domicile of the user.

In what may be termed a "basic" desk structure S, table top member 34 is thermoformed to provide a first cavity 70 in which may be seated writing tablet 72 held in position by clip means 74 affixed to table top member 34. A second cavity 76 may be thermoformed in top member 34 to receive therein mobile telephone 78 or other communication apparatus. Cavity 76 may be relatively deeper than as shown, so as to receive an organizer tray, which may be shaped to receive a beverage cup. In this event, the mobile or cellular telephone 78 may be located above the writing tablet 72, and by means of a suitable stand structure, affixed to table top member 34. Cavity 70 receiving writing tablet 72 may be upwardly inclined during formation to facilitate the writing task. As will also be appreciated, the table top member 34 during its production may be provided with a textured or wood-simulating appearance, or in other ways made harmonious with the vehicle interior.

Variations to the invention have been noted herein, and these and other modifications may of course be effected with departing from the spirit of the invention or the scope of the subjoined claims.

I claim:

1. A removable desk structure for use in a vehicle having an operator's seat and a console fixed to the vehicle in proximity to the operator's seat, said desk structure comprising:

a pair of laterally spaced leg members, each said leg member extending generally vertically between a lower portion and an upper portion and having inner and outer surfaces, said inner surfaces facing each other, at least one of said leg members having a back edge surface extending between said upper portion and said lower portion, said back edge surface adapted to face rearwardly when said desk structure is installed on the vehicle console, and said back edge surface being curvilinear between said lower portion and said upper portion to allow ready access to control mechanisms on the vehicle console by a person seated adjacent the vehicle console;

a table top member fixedly connected to said top portions of said leg members and having a plurality of cavities formed therein for receiving objects; and adjustment means connected to said lower portions of said leg members for selectively laterally adjusting a spacing between said inner surfaces at said lower portions of said leg members whereby said adjustment means selectively moves said lower portions away from one another to facilitate installation on and removal from the vehicle console and towards one another to firmly engage said inner surfaces with the vehicle console without damaging the vehicle console.

2. The desk structure according to claim 1, wherein at least one of said leg members is formed of a transparent material to allow viewing of control mechanisms on the vehicle console by a person seated adjacent the vehicle console when said desk structure is installed on the vehicle console.

3. The desk structure according to claim 1 including a stop means attached to said inner surface of at least one of said leg members for engaging an upper surface of the vehicle console when said desk structure is installed on the vehicle console.

4. The desk structure according to claim 1 wherein at least one of said cavities is shaped for receiving a writing tablet.

5. The desk structure according to claim 1 wherein at least one of said cavities is shaped for receiving a mobile telephone.

6. The desk structure according to claim 1 including a block member attached to and connected between said table top member and said upper portions of said leg members.

7. A removable desk structure for use in a vehicle having an operator's seat and a console fixed to said vehicle in proximity to said operator's seat, said desk structure comprising:

a pair of laterally spaced, generally vertically extending leg members, each said leg member having a lower portion, an upper portion, an inner surface and an outer surface, said inner surfaces facing each other;

a table top member fixedly connected to said leg members at said upper portions thereof for preventing relative movement between said table top member and each of said upper portions of said leg members and having a plurality of cavities formed therein for receiving objects;

stop means attached to said inner surface of at least one of said leg members for engaging an upper surface of the vehicle console when said desk structure is installed on the vehicle console; and adjustment means connected to said lower portions adjacent lower edges of said leg members for selectively laterally adjusting a spacing between said inner surfaces of said leg members whereby said adjustment means selectively moves said lower portions away from one another to facilitate installation on and removal from the vehicle console and towards one another to firmly engage side walls of the vehicle console.

8. The desk structure according to claim 7 wherein at least one of said leg members has a back edge surface extending between said upper portion and said lower portion, said back edge surface adapted to face rearwardly when said desk structure is installed on the vehicle console, and said back edge surface being curvilinear to allow ready access to control mechanisms on the vehicle console by a person seated adjacent the vehicle console.

9. The desk structure according to claim 7 wherein at least one of said leg members is formed of a transparent material to allow viewing of control mechanisms on the vehicle console by a person seated adjacent the vehicle console when said desk structure is installed on the vehicle console.

10. The desk structure according to claim 7 wherein at least one of said cavities is shaped for receiving a writing tablet.

11. The desk structure according to claim 7 wherein at least one of said cavities is shaped for receiving a mobile telephone.

12. The desk structure according to claim 7 wherein said adjustment means includes a rod externally threaded at one end and having a knob means mounted at an opposite end, said rod extending through a hole formed in one of said pair of leg members with said knob means adjacent said outer surface of said one leg member and said threaded one end extending toward said inner surface of the other one of said pair of leg members, a spring means having a reduced diameter portion formed at one end threadably engaging said threaded one end of said rod and a larger diameter portion formed at an opposite end, said spring means extending through a hole formed in said other leg member with said larger diameter portion adjacent said outer surface of said other leg member.

13. The desk structure according to claim 12 including a cover means extending between said inner surfaces of said leg members and enclosing at least a substantial portion of said rod and said spring means.

14. A removable desk structure for use in a vehicle having an operator's seat and a console fixed to said vehicle in proximity to said operator's seat, said desk structure comprising:

a pair of laterally spaced, generally vertically extending leg members, each said leg member having a lower portion, an upper portion, an inner surface, an outer surface and a back edge surface extending between said upper portion and said lower portion, said back edge surfaces adapted to face rearwardly when said desk structure is installed on the vehicle console, said back edge surfaces being curvilinear to allow ready access to control mechanisms on the vehicle console by a person seated adjacent the vehicle console, and said leg members being formed of a transparent material to allow viewing of the control mechanisms by a person seated adjacent the vehicle console;

a table top member fixedly connected to said leg members at said top portions thereof and having a plurality of cavities formed therein for receiving objects;

stop means attached to said inner surfaces of said leg members for engaging an upper surface of the vehicle console when said desk structure is installed on the vehicle console; and adjustment means connected to said lower portions of said leg members for selectively laterally adjusting a spacing between said inner surfaces of said leg members whereby said adjustment means selectively moves said lower portions away from one another to facilitate installation on and removal from the vehicle console and towards one another to firmly engage side walls of the vehicle console.

* * * * *